United States Patent [11] 3,630,783

[72] Inventor Franciszek Przybyla
  Toronto, Ontario, Canada
[21] Appl. No. 36,173
[22] Filed May 11, 1970
[45] Patented Dec. 28, 1971
[73] Assignee Mallory Battery Company of Canada Limited
  Clarkson, Ontario, Canada

[54] HEAT-SHRINKABLE PACKAGING FOR BATTERIES
  9 Claims, 4 Drawing Figs.
[52] U.S. Cl. ................................................ 136/107,
  136/166, 136/177
[51] Int. Cl. .................................................. H01m 21/00
[50] Field of Search ......................................... 136/107,
  131–133, 166–167, 169, 180, 163, 179, 177, 83, 147

[56] References Cited
UNITED STATES PATENTS
| | | | |
|---|---|---|---|
| 2,822,416 | 2/1958 | Parkinson ..................... | 136/107 |
| 3,066,179 | 11/1962 | Ruben ......................... | 136/83 |
| 3,096,217 | 7/1963 | Clune .......................... | 136/107 |
| 3,288,651 | 11/1966 | Linton .......................... | 136/107 |

*Primary Examiner*—Anthony Skapars
*Attorney*—Robert Levine

ABSTRACT: A heat-shrinkable insulating jacket surrounds the cell can, and is thus anchored and holds a cell-closure disc tightly to close the cell. A filament between can and jacket holds them slightly spaced along the filament enough to define two adjacent and parallel narrow limited air passages to serve as a vent passage alongside the filament.

PATENTED DEC 28 1971

3,630,783

INVENTOR
FRANCISZEK PRZYBYLA
BY
[signature]
ATTORNEY

HEAT-SHRINKABLE PACKAGING FOR BATTERIES

This invention relates to dry battery cells and particularly to a dry cell in which an insulating jacket is used, to provide an economical structure for throwaway cells. In addition, a vent passage is provided for the cell to permit excess bubbles to exit from the cell and thereby avoid creating an undesirable pressure within the cell, that would cause bulging of the usual container that serves as one of the electrodes, and that would also disturb a predesigned and preestablished physical relationship and disposition between the components of the cell, appropriate for optimum operation.

In prior conventional-type dry battery cells, a can has been used as one electric terminal of the cell, and has served also as a container for the other elements of the cell, which generally included a centrally or coaxially disposed anode assembly with suitable electrolyte material separated by an absorbent and inert membrane material from a depolarizer material, whose mutual operation would oxidize hydrogen bubbles formed during operation of the cell.

With recent and current improvements in the structure of the anode, said depolarizer material fails near the end of discharge, and as a result, substantial amounts of hydrogen are evolved. Due to increased corrosion rates of the improved anodes, a larger amount of hydrogen is evolved on storage. Hydrogen evolved increases pressure in cells considerably and tends to deform cell containers towards the end of discharge.

This invention provides a new and modified cell construction in which a vent passage is provided in a simple way to permit excess bubbles to exit from the cell and thus avoid generating an excess pressure within the cell, that might otherwise disturb the physical relation between the elements, as predesigned and disposed in the cell during manufacture, for optimum operation.

Since the ingredients in dry battery cells are used up in operation, the cells are therefore essentially throwaways, and economy of manufacture has always been an important factor to consider in the manufacturing process.

An important object of this invention is to provide a battery cell construction that is more economical than present cell construction, particularly in small size throwaways.

Another object of this invention is to provide an economical battery cell construction in including a venting system.

Another object of this invention is to provide a novel economical battery cell structure in which the venting systems is included with a minimum of handling.

Another object of this invention is to provide a battery cell structure in which a plastic heat-compressible jacket is employed instead of a conventional outer metal jacket, to reduce the number of handling operations and to eliminate a more costly metal-crimping operation.

In accordance with the principles of this invention, the cathode can container for the elements of the dry cell is substantially closed by a separate top insulating cover disc, and either the top edge of the can or the bottom edge of the disc is provided with a vent or exit port for bubbles from the cell. That vent or exit port is arranged to communicate with an elongated exit passage leading from that vent or exit port to the ambient external air. The exit passage from said vent or exit port is located and defined between the outer surface of the cathode can and the inner surface of an outer plastic jacket of insulating material that is heat-pressed onto the can for tight physical peripheral contact and anchorage, except for a narrow elongated exit air passage defined along a filamentary-shaped element disposed between the can and the insulating jacket, at least along the length of the can from the exit port, or vent, at the top of the can, to a region near the lower end of the can. Such filamentary element serves as a spacer between the cathode can and the surrounding insulating jacket, and serves to define and locate two elongated regions immediately adjacent and parallel to the filament and running alongside the full length of that filament.

Such a passage need not be very large transversely, in section, to permit gas venting of the cell, to permit exit passage of the bubbles formed in the cell. In addition, however, this passage serves another function. It is sufficiently small in section, transversely, and also long, either along the length of the cell cathode can, or along a helical path around the can, to serve as a reservoir to hold enough of the exiting bubbles to permit those bubbles to shift in reciprocation, and to act as a moving seal according to the temperature and pressure within the cell, and thus serve as a shifting seal to hold the cell substantially closed to the ambient air, while at the same time permitting exiting of the excess bubbles from the cell, and at the same time preventing breathing that would otherwise permit any external ambient air to enter the cell and interfere with its normal intended chemical operation.

An important feature of this invention is that efficient venting is accomplished independently of the position of the cell. Pressure of hydrogen bubbles generated anywhere in the cell will increase above the sum of pressure in the venting passage and the small hydrostatic pressure of electrolyte; therefore, a pressure differential will drive gas bubbles towards the venting passage even at the "upside-down" position of the cell.

In present conventional practice, the cathode can is encircled with a tube of insulating material, such as paper, and an outer metallic tube is then applied to encircle the paper tube, and both are suitably crimped at top and bottom ends, to suitably crimp a closure element on the can, and to crimp top and bottom electrode elements to the can, to enable the battery cell to be readily applied to an external circuit.

The external metal tube and the two metal-crimping operations are expensive in the manufacture of a cell.

An important object of this invention is to provide a structure that eliminates the need for the outer metal jacket, as part of the closure elements of the cell, and thus also eliminate the concomitant handling operations for applying and crimping said metal jacket, by substituting a heat-pressed plastic jacket of suitable material to harden upon cooling and to anchor itself to the cathode can, with suitable heat-deformed end crimps, easily and readily formed and more economic than similar metal deformations.

The details of construction of one modification of a cell made in accordance with the principles of this invention, are described more fully in the following specification, taken together with the accompanying drawings, in which.

Figure 3:
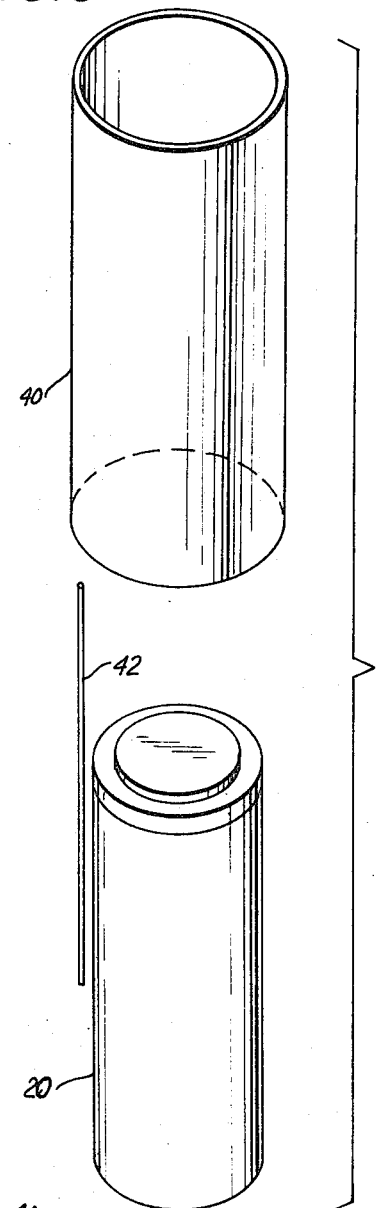
Figure 4:
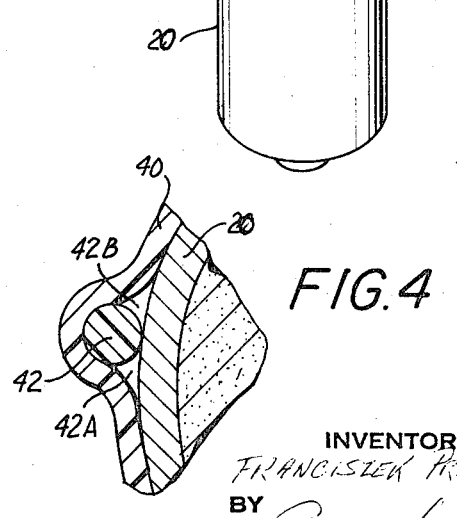

FIG. 3 is a schematic view showing the manner in which the filamentary element is disposed between the cathode can or container of the cell and the outer encircling jacket of insulating material; and FIG. 4 is an enlarged sectional view of the arrangement of the filamentary element shown in FIG. 3, to illustrate the manner in which the outer jacket is spaced from the can of the cell by and along the filament, to provide two small airspaces alongside and parallel to the filament, to serve as venting spaces or exiting passages for bubbles from the cell.

Figure 1:
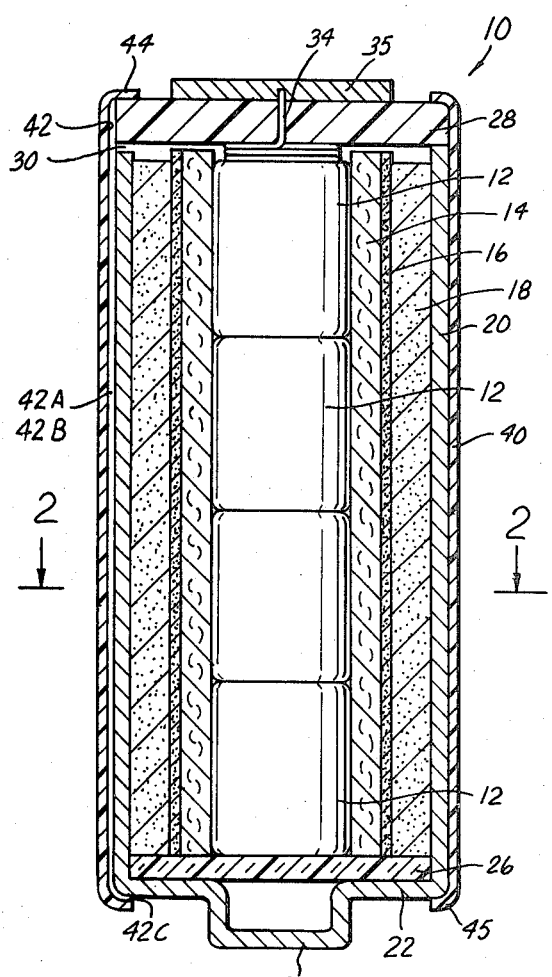
FIG. 1 is a vertical transverse section taken through the cell, with the central electrode shown in elevation.

As shown in FIG. 1, a cell 10, embodying the present invention, comprises a central axial negative electrode 12 shown as made up of several sectional elements of electrode material surrounded by a cylindrical body of absorbent or cellulosic or felt material 14 soaked with a suitable electrolyte consistent with the central anode material to establish desired appropriate chemical action for the battery cell operation.

A cylindrical barrier 16 surrounds and confines the paste material 14 and serves as a separator between the cathode and the anode regions of the cell. Separator 16 is made of relatively porous paper or other suitable insulating material such as a plastic with sufficient porosity to permit ionic transfer but not chemical reaction between the materials in the two regions of the cell, while at the same time separating the anode material 12 physically from a cylindrical body of depolarizing material 18 that is disposed concentrically around the separator 16 and in contact with a metal can 20 that serves as a container and cathode for the cell.

As shown in FIG. 1, the external can 20 is closed at the bottom to provide a bottom floor 22, and is also coaxially depressed to provide a central button contact 24 to serve as an external contact terminal for the cell. For insulation purposes between the can 20, as cathode and the central anode elements 12, an insulating disc 26 is provided which serves both as a spacing separator between the anode 12 and the cathode can 20, and serves also as an insulating support for the electrolyte paste material 14, the separator 16 and the depolarizing material 18.

At the other end of the can 20, an insulating closure disc 28 is disposed and it serves to close the can 20 except for a small exit port or vent 30, shown at the upper left-hand side of the can in FIG. 1. That exit port 30 may be a small notch in the wall at the top end of the can 20, or it may be provided by a notch (not shown) in the surface of closure disc 28.

The top closure disc 28 serves also as a support for a terminal contact button 35 electrically connected to anode 12, to which the button is connected by a suitable element shown in the form of a compressible contact spring 34. The cell is made up of the forgoing components in which the button 24 at the bottom of the cell serves as one contact terminal of the cell, and the metal button 35 at the top of the cell serves as the other terminal of the cell for connection in an external circuit.

Figure 2:
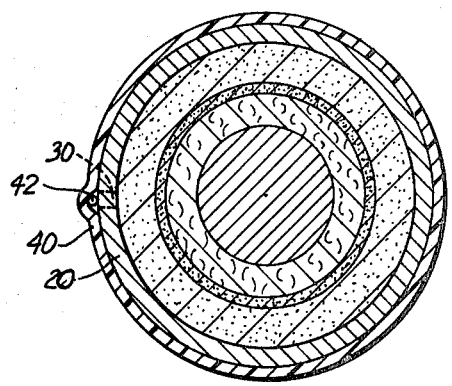
FIG. 2 is a horizontal transverse section through the middle of the cell taken along the section line indicated by 2—2 in FIG. 1.

In accordance with the principles of this invention, the cell can 20 is covered by a tubular plastic jacket 40, which is illustrated for the present modification as a heat-shrinkable tube of plastic material. In addition, in order to provide a venting air passage for the cell, a filament 42, which preferentially is a plastic or plastic-coated metal, is supported between the cell can 20 and the external insulating jacket 40, to be held between those two cylindrical bodies when external jacket 40 is heat shrunk onto the metal can 20. When the external insulating jacket 40 is shrunk onto the can 20, the jacket and the can will engage in close surface-to-surface contact except for a narrow region defined along the filamentary spacing element 42, as illustrated and shown in FIGS. 2 and 4. As there shown, the filamentary element 42 serves to separate the outer jacket 40 from the can 20 by and along the two elongated vent passages 42A and 42B running lengthwise along the two opposite sides of the filamentary element 42.

The opening at the vent port 30, at the top of the can of the cell, communicates with the two elongated passages 42A and 42B. Any bubbles passing out through the vent port 30 will move down through passages 42A and 42B to the outlet port 42C of those two passages, where the bubbles generated in the cell will then pass out into the ambient air to be dissipated.

As shown further in FIG. 1, the upper end of the outer plastic jacket 40 is heat-pressed over as a flange 44 to fit over the outer border of the top closure disc 28, and that flange 44 is bonded to the disc 28, by any suitable precess, to provide a hermetic seal at the top of the can except for the intended vent 30 and the communicating exit passages 42A and 42B.

Similarly, the plastic insulating jacket 40 is flanged at its bottom at 45, around the lower end of the can 20 for relatively close fit except for the outlet venting port 42C. Thus the jacket 40 is heat shrunk tightly onto the can 20 along the can body and at the top and bottom heat-pressed flanges of the jacket, except along the filament 42 and its two adjacent air passages. The jacket locks the top closure disc 28 in place to seal the top of can 20, except for the vent, as desired. This construction provides economy and eliminates many handling operations, as well as the conventional outer metal jacket currently used to crimp and hold the top and bottom terminal electrode caps for the battery cell.

It is clear that it is intended to be within the scope of this invention that the structural details of the cell itself may be varied in form, while at this same time providing a heat-pressed jacket for economy and also providing the exit port for venting the cell; and have the passage suitably arranged along the length or around the periphery of the cell, as for example in FIG. 1, or by a filament wound helically around the can to provide a longer exit passage for the bubbles, which may include other gaseous molecular byproducts.

Thus, the invention may be varied in form without departing from the spirit and scope thereof as defined in the claims.

What is claimed is:

1. A primary electric dry cell, comprising a cup- or can-shaped cathode electrode open at the top; an anode electrode concentrically spaced within the said can; an electrically conductive depolarizer material engaging the inner surface of said can; a porous separator within said depolarizer material, and defining a chamber encircling said anode electrode; an electrolyte within said chamber within said separator; a circular insulating cap having a peripheral edge surface and a top annular border area, and closing the open top of said can; an insulating plastic tube housing, snugly engaging and surrounding said can and hermetically sealed to the top annular border area of said circular insulating cap and substantially enclosing said can; and venting means between said can and said housing, and communicating between the inner space in said can and outer space outside said can, and providing a free-venting passage for any excess bubbles generated in the cell, independently of its position.

2. A primary electric dry cell, as in claim 1, in which said insulating plastic tube is heat shrunk onto said can for anchorage thereto, and is seal bonded to said annular edge border of said cap and holding said cap in tightly closing position on said can; and said venting means is disposed along the inner surface of said plastic tube and extends to outside one end of said plastic tube defining a colinear free space providing free-exit passage to any gas bubbles generated in said closed cell during operation by current between said electrodes or during storage.

3. A primary dry cell as in claim 2, in which said plastic housing snugly engages said cylindrical can terminal except along a linear region along which the housing is spaced from said can electrode defining an exit passage communicating at its upper or inner end with the space within the cylindrical can and extending to its lower end to an open port communicating with outer space, outside of the cell providing and serving as a vent passage for gas bubbles formed in the cell.

4. A primary dry cell as in claim 3, in which said venting means comprises a filamentary element disposed and held between the cylindrical plastic housing and the cylindrical can terminal, and said filamentary element serves as a spacer defining a limited linear region as an exit passage along which said plastic housing is spaced from said can.

5. A primary dry cell, as in claim 3 in which said can terminal is closed at the bottom and open at the top; and said top insulating disc closes the top opening of said can except for a small opening serving as a vent port for any bubbles formed in the space within said can, said vent port being disposed in spatial communication with said linear free exit passage permitting bubbles to pass freely out of said cell as a whole.

6. A primary dry cell, as in claim 5, in which said top insulating disc is supported on the upper end of said can electrode, and in turn supports a terminal plate on its outer exposed surface; and said terminal plate is electrically connected to said anode electrode within the cell.

7. A primary dry cell, as in claim 6, in which said plastic housing is of heat-shrinkable tubing fitting snugly around the can electrode along the length of said can electrode, and to fit around the circular border of said top insulating disc in peened-over flange relation, and fitting around the bottom end of said can in peened-over relation, with a small vent opening left at the bottom of said plastic housing providing an exit port for free exit of bubbles transversing said free passage along the inner surface of said snug housing.

8. A primary dry cell, as in claim 7 in which said peened-over upper flange of said snug plastic housing is sealed around the rim of said border insulating disc at the top of the can providing a top hermetic seal closure, 9. A primary dry cell, as in claim 7, in which said vent means of claim 1 disposed along the inner surface of said snug housing defining a free space serving as a discharge passage for bubbles from said cell, consists of an elongated filamentary element squeezed between the can and the snug heat-shrinkable enclosure, and defining limited free-gas passages alongside said filamentary element, communicating with the inside of the cell and the space outside the cell.

* * * * *